United States Patent [19]

Henry et al.

[11] Patent Number: 4,594,494

[45] Date of Patent: Jun. 10, 1986

[54] MODULAR WELDING APPARATUS HAVING TWO MOVABLE WELDING ELECTRODES

[75] Inventors: Dale V. Henry, West Lampeter Township, Lancaster County; Donald B. Kaiser, Manor Township, Lancaster County, both of Pa.

[73] Assignee: RCA Corporation, Princeton, N.J.

[21] Appl. No.: 698,785

[22] Filed: Feb. 6, 1985

[51] Int. Cl.⁴ .................................................. B23K 9/32
[52] U.S. Cl. ...................................... 219/86.8; 219/86.25
[58] Field of Search ............................. 219/86.25, 86.8

[56] References Cited

U.S. PATENT DOCUMENTS

| | | | |
|---|---|---|---|
| 1,434,374 | 11/1922 | De Lemon et al. | 219/86.25 |
| 2,021,477 | 11/1935 | Bohn | 219/91.21 |
| 2,276,770 | 3/1942 | Green | 219/86.8 |
| 2,476,454 | 7/1949 | Reed | 219/86.8 |
| 2,850,619 | 9/1958 | De Lucia | 219/89 |
| 3,024,351 | 3/1962 | Parrott | 219/86.25 |
| 3,100,832 | 8/1963 | Sosoka et al. | 219/86.25 |
| 3,117,216 | 1/1964 | Stewart | 219/86.25 |
| 3,148,264 | 9/1964 | Clark, Jr. et al. | 219/86.8 |
| 4,473,734 | 9/1984 | Henry | 219/86.8 |

Primary Examiner—Clarence L. Albritton
Assistant Examiner—Catherine M. Sigda
Attorney, Agent, or Firm—Eugene M. Whitacre; Dennis H. Irlbeck; Vincent J. Coughlin, Jr.

[57] ABSTRACT

A modular welding apparatus comprises a welding assembly having a welding head with an integral actuating assembly. A foot treadle initiates motion of the welding head. A conductive base member is spaced from the welding head. A welding power supply has one lead connected to the welding head and a second lead connected to the base member. An interchangeable welding module is disposed on the base member in electrical contact therewith. The welding module includes a conductive support plate and a locking cam for detachably attaching the support plate to the base member. Two movable, pre-aligned welding electrodes are disposed on the welding module. One of the welding electrodes is electrically connected to the base member and the other welding electrode is electrically connected to the welding head. At least one of the electrodes is in communication with the actuating assembly.

3 Claims, 6 Drawing Figures

MODULAR WELDING APPARATUS HAVING TWO MOVABLE WELDING ELECTRODES

The present invention relates to electrical resistance welding and, more particularly, to a welding apparatus having interchangeable welding modules with two movable, pre-aligned welding electrodes.

U.S. Pat. No. 2,850,619, issued to M. S. DeLucia on Sept. 2, 1958, shows an electric resistance welder having two welding electrodes. The electrodes are generally designed to perform a number of different welding operations; however, depending on the shape of the parts to be welded, it is often necessary to replace one or both of the electrodes with electrodes that are specially configured to perform a particular welding operation. The changing of welding electrodes and the alignment of the electrodes after such a change are time consuming and inefficient. It is therefore desirable to be able to change electrodes rapidly to perform a number of different welding operations requiring different electrode configurations, and to effect the electrode change without requiring realignment of the welding electrodes.

U.S. Pat. No. 4,473,734, issued to D. V. Henry on Sept. 25, 1984, discloses a modular welding apparatus having interchangeable welding modules. The Henry patent assigned to the assignee of the present invention, is incorporated by reference herein for the purpose of disclosure. Each of the modules can be designed to perform a particular welding operation, and a number of different welding operations can be done on the same welding apparatus by changing from one module to another. The patented modules have pre-aligned welding electrodes, and module change-over can be rapidly achieved with a minimum of down-time. A drawback of the patented interchangeable welding modules described in the Henry patent is that each module only has one movable, or articulated, welding electrode. The other welding electrode is fixed relative to the articulated welding electrode, thus, a number of welding operations which require two movable welding electrodes cannot be performed using the interchangeable modules of the Henry patent.

SUMMARY OF THE INVENTION

A modular welding apparatus comprises a welding assembly having a welding head with actuating means attached thereto. Means are provided for activating the welding head. A conductive base member is spaced from the welding head. An interchangeable welding module is detachably attached to the base member. Means are included for providing a first potential to the welding head and a second potential to the base member. The interchangeable welding module is improved by providing two movable, pre-aligned welding electrodes, one of which is electrically connected to the base member and the other of which is electrically connected to the welding head. At least one of the welding electrodes communicates with the actuating means.

DETAILED DESCRIPTION OF THE PREFERRED EMBODIMENTS

Figure 1:
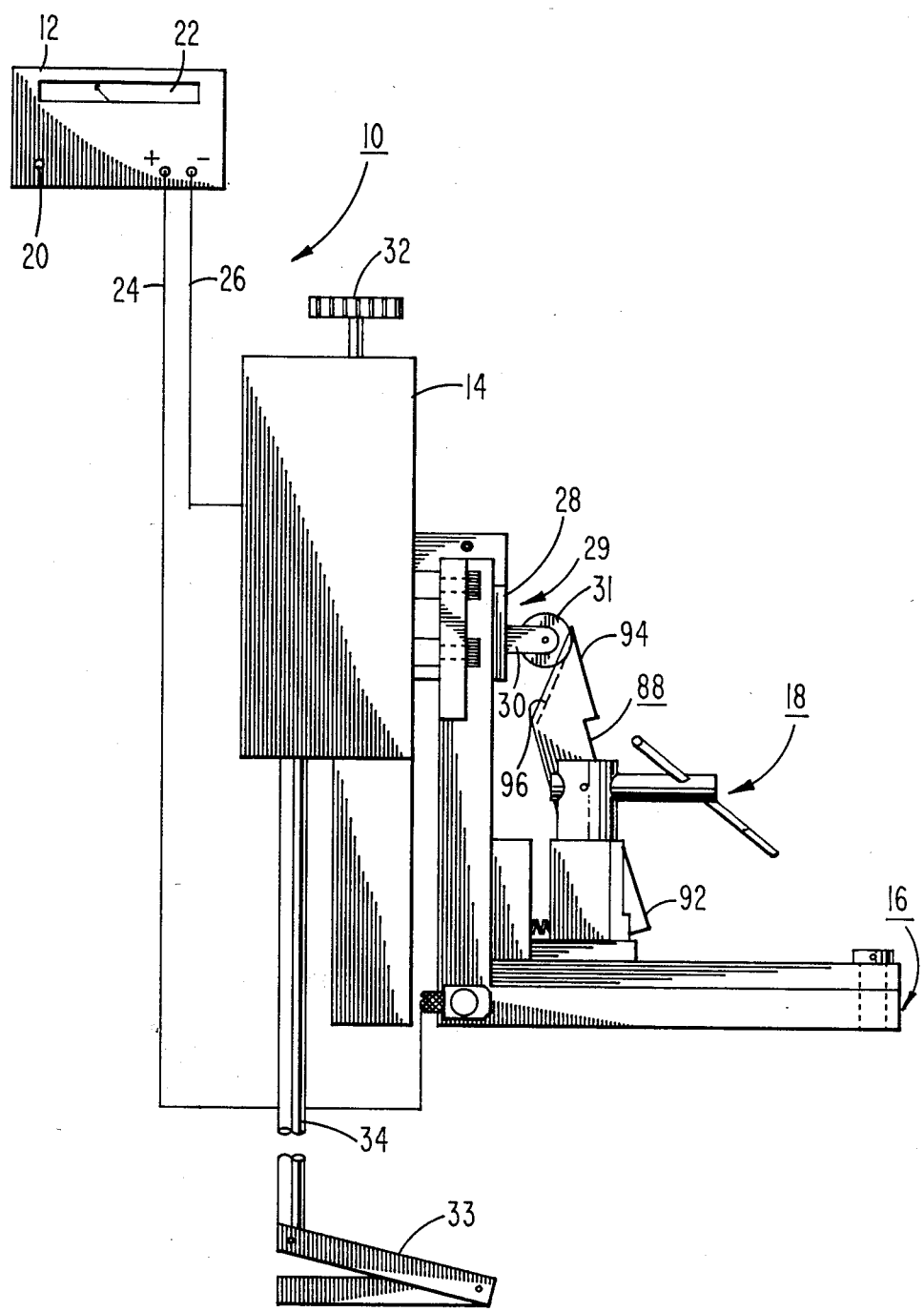
FIG. 1 is a schematic diagram of a modular welding apparatus according to the present invention.

As shown in FIG. 1, a modular electrical resistance welding apparatus 10 comprises a power supply 12, a welding head assembly 14, a conductive base member 16 and an interchangeable welding module 18. The power supply 12 and the welding head assembly 14 are conventional and need not be described in detail. The power supply 12 includes a welding current adjustment knob 20, a welding current meter 22 and a pair of power-output cables 24 and 26. In the present structure, the positive power cable 24 is connected to the base member 16, and the negative power cable 26 is connected to the welding head assembly 14. The welding head assembly 14 includes a welding head 28, an actuating means 29 comprising a conductive support rod 30 and a conductive wheel 31 affixed to the support rod 30. The support rod 30 and wheel 31 are described more fully in the above-referenced U.S. Pat. No. 4,473,734. The assembly 14 further includes a welding pressure adjustment knob 32. A foot treadle 33 is connected by a connecting arm 34 to the welding head assembly 14 to cause the welding head 28 to move up and down in a reciprocating manner.

Figure 2:
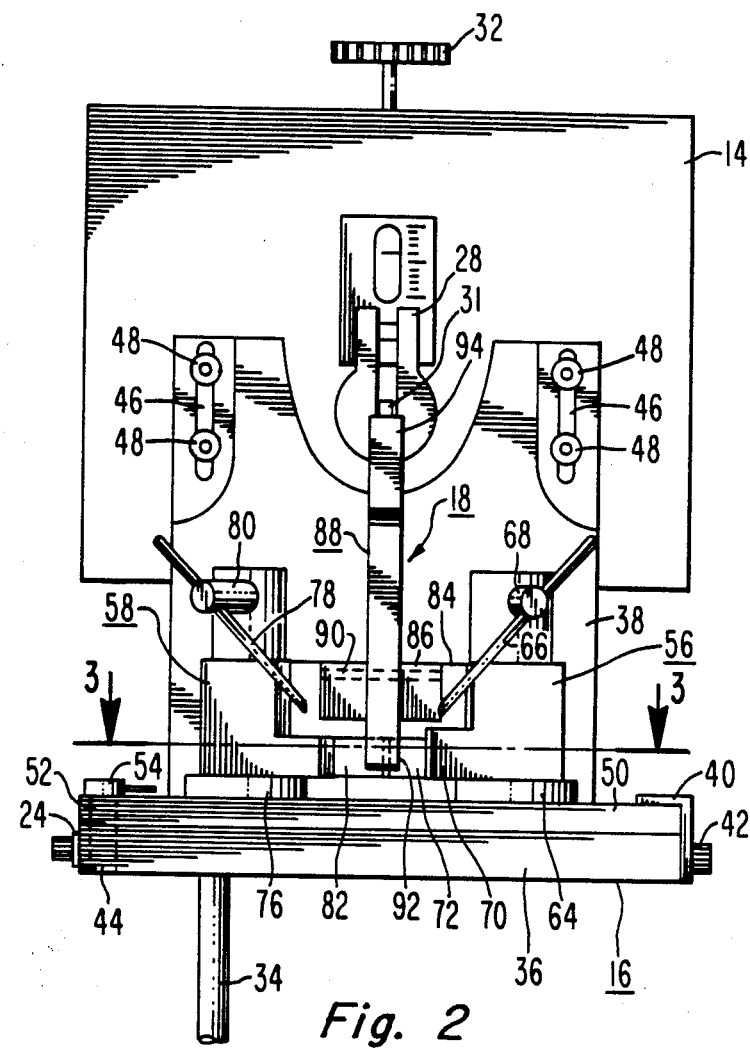
FIG. 2 is a front elevational view of a welding assembly and an embodiment of a novel interchangeable welding module.

As shown in FIG. 2, the interchangeable welding module 18 is disposed on the conductive base member 16. The base member 16 comprises a metal base plate 36 with an upright metal support member 38 attached thereto. The base plate 36 has an alignment stop member 40 attached to one side thereof. The stop member 40 may be secured to the base plate 36 by a bolt 42 or it may be permanently attached thereto, for example, by welding. An alignment aperture 44, shown in phantom, is provided in the base plate 36 adjacent to the opposite side of the base plate to which the alignment stop member 40 is attached. The positive power cable 24 is secured to one side of the base plate 36. A pair of elongated slots 46 are formed in the upright support member 38 adjacent to the upper sides thereof. A plurality of bolts 48 extend through the slots 46 to attach the base member 16 to the welding head assembly 14 and to align it therewith.

Figure 3:
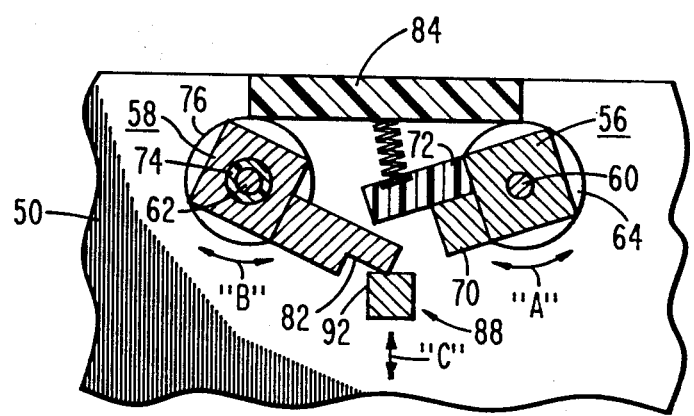
FIG. 3 is a partial sectional view taken along line 3—3 of FIG. 2.
Figure 4:
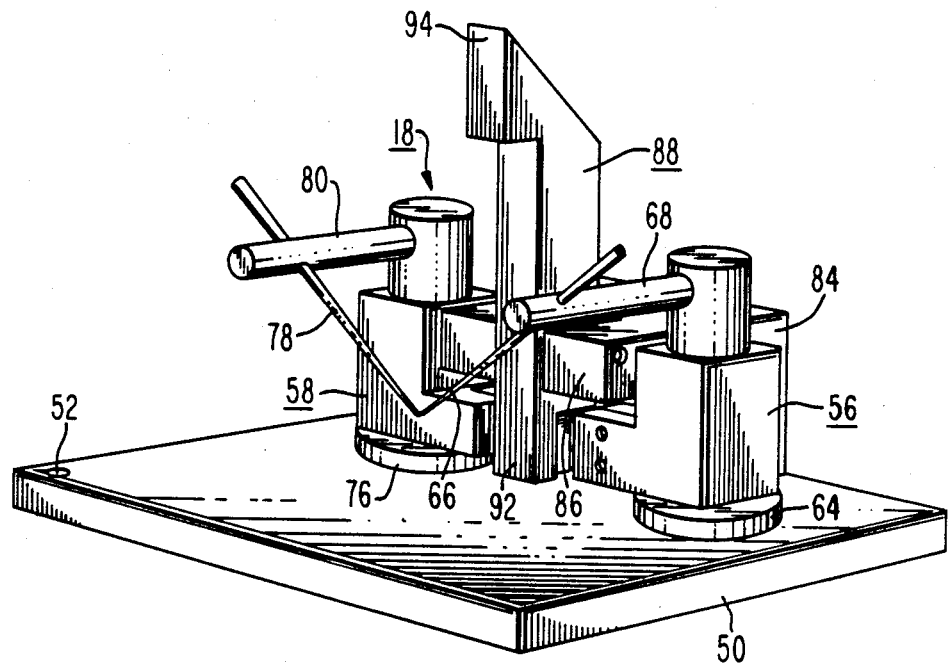
FIG. 4 is a perspective view of the novel interchangeable module.

The interchangeable welding module 18, shown in FIGS. 2, 3 and 4, comprises a conductive support plate 50 in electrical contact with the base plate 36. A support plate alignment aperture 52, shown in phantom, is provided in the support plate 50. The support plate alignment aperture 52 is slightly larger in diameter than the alignment aperture 44 formed in the base plate 36. A locking cam 54 is disposed through the aligned support plate alignment aperture 52 and the base plate alignment aperture 44. The locking cam 54 includes an eccentric locking portion (not shown) which urges the support plate 50 against the alignment stop member 40. A pair of welding electrode assemblies 56 and 58 are pivotably attached to the support plate 50 by means of conductive support pins 60 and 62, respectively. The welding electrode assembly 56 has an aperture (not shown) formed therein which conforms closely to the support pin 60 and permits the electrode assembly 56 to rest upon and pivot about the pin 60 in the directions shown by the arrow "A" in FIG. 3. A first insulating disc 64 spaces the electrode assembly 56 from the support plate 50. The electrode assembly 56 is electrically connected to the support plate 50 through support pin 60. A first welding electrode 66 is detachably attached to a first arm 68 extending outwardly from the electrode assembly 56. The electrode assembly 56 includes a first projection 70 to which an insulating block 72 is attached for a reason to be described hereinafter. The first projection 70 is directed generally toward the other electrode assembly 58. The other welding electrode assembly 58 also has an aperture (not shown) formed therein into which an insulative cup 74 is pressed. The insulating cup 74 encompasses the support pin 62 and permits the other electrode assembly 58 to rest upon and pivot about the pin 62 in the directions shown by the arrow "B" in FIG. 3. A second insulating disc 76 spaces the electrode assembly 58 from the support plate 50. A second welding electrode 78 is detachably attached to a second arm 80 extending outwardly from the other electrode assembly 58. The welding electrodes 66 and 78 are pre-aligned to abut one another in the closed position, as shown in FIG. 4. The other electrode assembly 58 includes a second projection 82 which is directed generally toward the electrode assembly 56. An insulating support member 84 is attached to the upper surface of the support plate 50 and has an insulating support portion 86 which extends between the welding electrode assemblies 56 and 58. The support portion 86 is bifurcated to accommodate a conductive welding electrode assembly contact member 88. A contact member support pin 90, shown in phantom in FIG. 2, extends through aligned apertures in the bifurcated support portion 86 and in the contact member 88 to pivotably support the contact member 88. The contact member 88 includes a proximal end 92 and a distal end 94. The proximal end 92 of the contact member 88 is in electrical contact with the second projection 82 of the other electrode 58. As shown more clearly in FIG. 1, the distal end 94 of the contact member 88 is in electrical contact with the conductive wheel 31 of the actuating means 29 of the welding head 28.

In order to initiate a weld, the operator depresses the foot treadle 33, shown in FIG. 1, to begin a downward movement of the welding head 28. The conductive wheel 31 rolls downward along a trough 96 formed in the sloping rear surface of the distal end 94 of the contact member 88. The downward motion of wheel 31 causes the contact member 88 to pivot about the support pin 90 so that the proximal end 92 of the contact member 88 is urged inwardly in the direction of arrow "C" in FIG. 3 against the second projection 82 of the other welding electrode assembly 58. The inward motion of the proximal end 92 causes a counter-clockwise pivotal rotation of the other electrode assembly 58 which, in turn, contacts the insulating block 72 attached to the welding electrode assembly 56 and causes a clockwise pivotal rotation of the electrode assembly 56. The pivotal movement of the welding electrode assemblies 56 and 58 results in closure and abuttment of the normally spaced-apart welding electrodes 66 and 78. FIG. 4 shows the electrodes 66 and 78 in the closed position. The welding electrode assembly 56 is electrically connected to the positive terminal of the power supply 12 through the support pin 60, support plate 50, base plate 36 and power cable 24. The welding electrode assembly 58 is connected to the negative terminal of the power supply 12 through the contact member 88, actuating means 29, welding head 28 and negative power cable 26. A spring member 98, which is shown in FIG. 3 to be disposed between the insulating support member 84 and the insulating block 72, returns the welding electrodes 66 and 78 to their normally spaced-apart relation at the completion of the weld.

Figure 6:
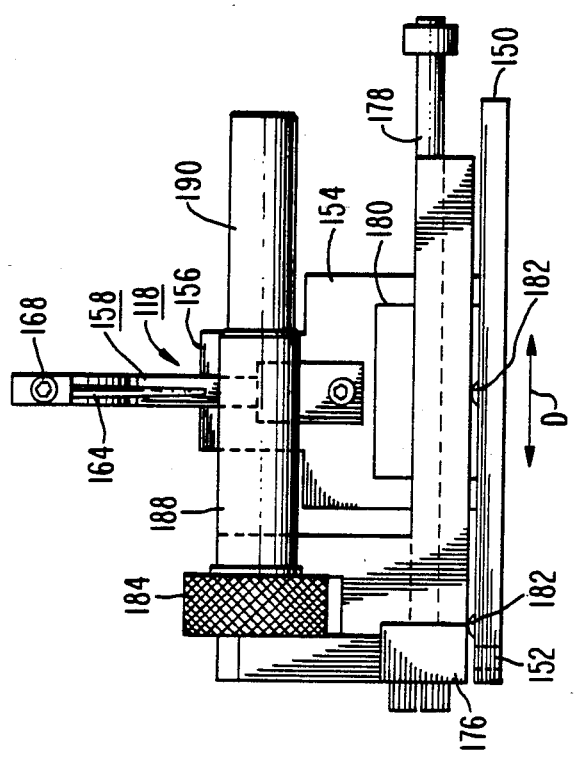
FIG. 6 is a front elevational view of the second embodiment of the interchangeable welding module.
Figure 5:
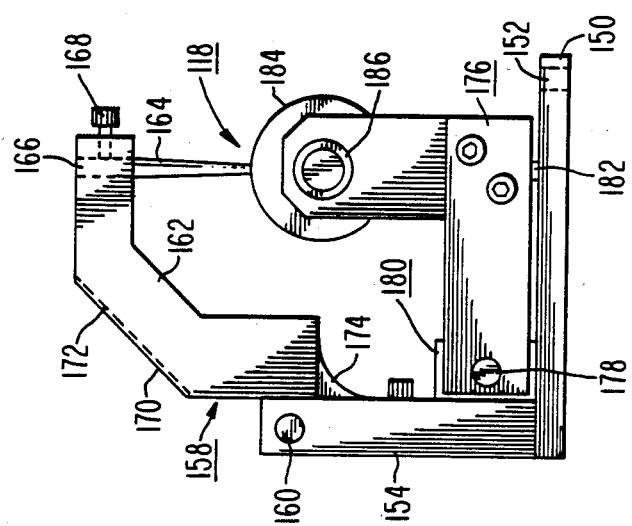
FIG. 5 is a side elevational view of a second embodiment of an interchangeable welding module.

A second embodiment of an interchangeable welding module 118 is shown in FIGS. 5 and 6. The welding module 118 comprises a conductive support plate 150 having a support plate alignment aperture 152 formed therein and shown in phantom. The support plate alignment aperture 152 is positioned to align with the alignment aperture 44 formed in the base plate 36 when the welding module 118 is disposed on the base member 16. An insulative vertical member 154 is affixed to the upper surface of the conductive support plate 150. A narrow vertical channel (not shown) is provided in the top portion 156 of the vertical member 154 to accommodate an articulated welding electrode assembly 158. A dowel pin 160 retains the electrode assembly 158 within the channel formed in the vertical member 154. The electrode assembly 158 comprises a conductive upper electrode holder 162 having an aperture (not shown) which accommodates the dowel pin 160. A welding electrode 164 is detachably disposed within a receiving aperture 166, shown in phantom in FIG. 5, and retained therein by means of a thumb screw 168. A rear-facing inclined surface 170 of the upper electrode holder 162 is provided with a shallow trough 172 to accommodate the conductive wheel 31 of the actuating means 29. A strip 174 of resilient material, such as spring steel, is secured between the insulative vertical member 154 and the lower surface of the upper electrode holder 162. A lower electrode holder 176 is disposed in electrical contact with the conductive support plate 150. The lower electrode holder 176 is affixed to carriage rod 178 which is disposed within an aperture (not shown) formed in a housing 180. The housing 180 comprises an insulating block integral with or affixed to the insulative vertical member 154. A plurality of insulating domes 182 support the lower electrode holder 176 in a plane parallel to the support plate 150. The carriage rod 178 moves freely within the aperture formed in the housing 180 to provide translational motion of the lower electrode holder 176 in the directions of arrow "D" in FIG. 6. A rotatable mandrel 184, comprising the second welding electrode, is disposed within a bearing sleeve 186 provided in the lower electrode holder 176. The mandrel 184 is shown as having portions 188 and 190 of two different diameters on which tubular sections can be welded. It should be clear to one skilled in the art that the mandrel 184 may have greater or fewer portions of different diameters, depending on the welding operation to be preformed thereon. In the operation of the second embodiment, the actuating means 29 causes the articulated welding electrode assembly 158 to move up and down so that the pre-aligned welding electrode 164 contacts a workpiece (not shown) disposed over the portions 188 or 190 of the mandrel 184. Translation and rotation of the lower electrode holder 176 and mandrel 184 must be manually accomplished; however, the usefulness of the modular welding apparatus is greatly increased over that described in U.S. Pat. No. 4,473,734.

What is claimed is:

1. In a modular welding apparatus comprising a welding assembly including a welding head with actuating means attached thereto, means for activating said welding head, a conductive base member spaced from said welding head, an interchangeable welding module having a conductive support plate detachably attached to said base member, and means for providing a first potential to said welding head and a second potential to said base member, the improvement wherein said interchangeable welding module comprises two pre-aligned welding electrodes pivotably attached to said support plate, one of said welding electrodes being electrically connected to said base member and the other of said welding electrodes being electrically insulated therefrom, the other of said welding electrodes being electrically connected to said welding head, at least one of said welding electrodes being in communication with said actuating means, whereby movement of said actuating means provides pivotable movement of said welding electrodes.

2. In a modular welding apparatus comprising a welding assembly including a welding head with actuating means attached thereto, means for activating said welding head, a conductive base member spaced from said welding head, an interchangeable welding module detachably attached to said base member, and means for providing a first potential to said welding head and a second potential to said base member, the improvement wherein said interchangeable welding module comprises a conductive support plate disposed on said base member and in electrical contact therewith, a pair of welding electrode assemblies pivotably attached to said conductive support plate, one of said welding electrode assemblies being electrically connected to said conductive support plate and the other welding electrode assembly being electrically insulated therefrom, each of said welding electrode assemblies having a welding electrode attached thereto, said welding electrodes being pre-aligned and disposed in normally spaced-apart relation, welding electrode assembly contact means extending between said other welding electrode assembly and said actuating means of said welding head, said contact means being responsive to said actuating means, whereby movement of said actuating means is communicated to said other welding electrode assembly by said contact means, thereby initiating pivotal movement of said welding electrode assemblies and closure of said welding electrodes, and biasing means for returning said welding electrodes to their normally spaced-apart positions.

3. In a modular welding apparatus comprising a welding assembly having a welding head with actuating means attached thereto, said actuating means including a conductive support rod having a conductive wheel attached thereto, said support rod being attached within said welding head, means for activating said welding head, a conductive base member spaced from said welding head, said base member having an alignment stop and a base alignment aperture therein, an interchangeable welding module including a conductive support plate disposed on said base member and being in electrical contact therewith, said conductive support plate having a support plate alignment aperture therein, said plate alignment aperture being aligned with said base alignment aperture, a locking cam disposed within said aligned apertures for detachably attaching said interchangeable welding module to said base member, the improvement comprising a pair of welding electrode assemblies pivotably attached to said conductive support plate, one of said welding electrode assemblies being electrically connected to said conductive support plate, the other of said welding electrode assemblies being electrically insulated therefrom, each of said welding electrode assemblies having a welding electrode attached thereto, said welding electrodes being pre-aligned and disposed in normally spaced-apart relation, an insulating support member attached to said conductive support plate, said insulating support member having a support portion extending between said welding electrode assemblies, a conductive welding electrode assembly contact member pivotably attached to said support portion of said insulating support member, said contact member having a proximal end in electrical contact with the other welding electrode assembly and a distal end in electrical contact with said conductive wheel of said actuating means of said welding head, whereby movement of said actuating means urges said contact member against said other electrode assembly, thereby initiating pivotal movement of said welding electrode assemblies and closure of said welding electrodes, and biasing means acting on said welding electrode assemblies for returning said welding electrodes to their normally spaced-apart positions.

* * * * *